United States Patent
Notaras et al.

(10) Patent No.: US 8,210,272 B2
(45) Date of Patent: Jul. 3, 2012

(54) TILLER

(76) Inventors: John Arthur Notaras, Lilyfield (AU); Angelo Lambrinos Notaras, Lilyfield (AU)

( * ) Notice: Subject to any disclaimer, the term of this patent is extended or adjusted under 35 U.S.C. 154(b) by 0 days.

(21) Appl. No.: 12/973,037

(22) Filed: Dec. 20, 2010

(65) Prior Publication Data
US 2011/0083866 A1    Apr. 14, 2011

Related U.S. Application Data

(62) Division of application No. 11/916,032, filed on Nov. 30, 2007, now Pat. No. 7,878,260.

(51) Int. Cl.
*A01B 33/00* (2006.01)
(52) U.S. Cl. ........................................................ 172/42
(58) Field of Classification Search ............. 172/15, 172/40–43, 48, 53, 84, 88, 94; 56/12.7, 17.5, 56/17.6, 16.7, 11.9; 30/218–228
See application file for complete search history.

(56) References Cited

U.S. PATENT DOCUMENTS

| | | | | |
|---|---|---|---|---|
| 3,805,385 A * | 4/1974 | Ritums et al. | .................. | 30/220 |
| 4,776,405 A * | 10/1988 | Grieder et al. | .................. | 172/42 |
| 5,287,770 A * | 2/1994 | Mudd | ........................ | 74/606 R |
| 7,237,620 B2 * | 7/2007 | Abenroth et al. | ................ | 172/42 |

* cited by examiner

*Primary Examiner* — Robert Pezzuto
(74) *Attorney, Agent, or Firm* — Design IP

(57) ABSTRACT

A tiller with chassis, pair of handles, and tines, wherein simultaneously raising one handle and lowering the other twists the chassis to lower one tine and raise the other. The tines comprise pairs of blades, each blade having a pair of upturned tips. The height of tines is adjusted by adjusting the support for a wheel. The tiller is supported by an arm having a single ground engaging wheel, pivoting the arm and locking in position to adjust the height of the tiller. The tiller includes a third handle located along its chassis. The chassis is formed from two longitudinally split components. A blade cover for the tiller is thin and curved to lie in an arc spaced from the rotating tips of the tines. An attachment for the tiller has a V-shaped tip and shaped to form a furrow.

9 Claims, 16 Drawing Sheets

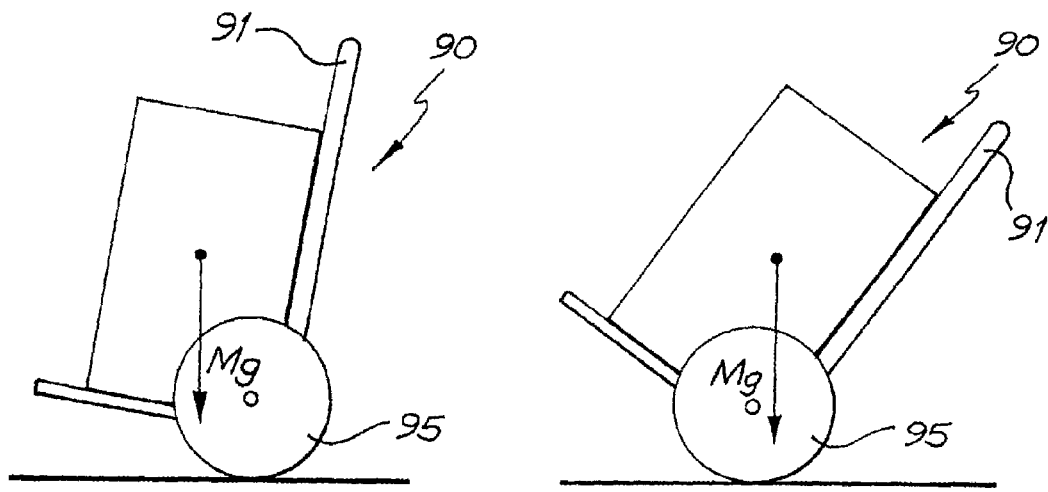
FIG. 3
PRIOR ART
FIG. 4
PRIOR ART
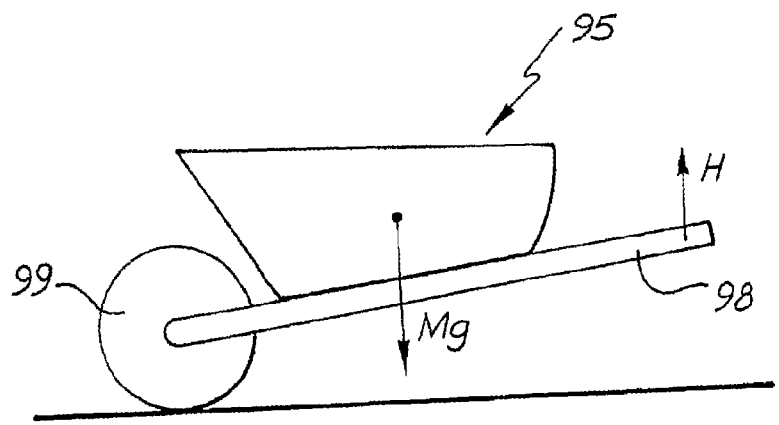
FIG. 5
PRIOR ART

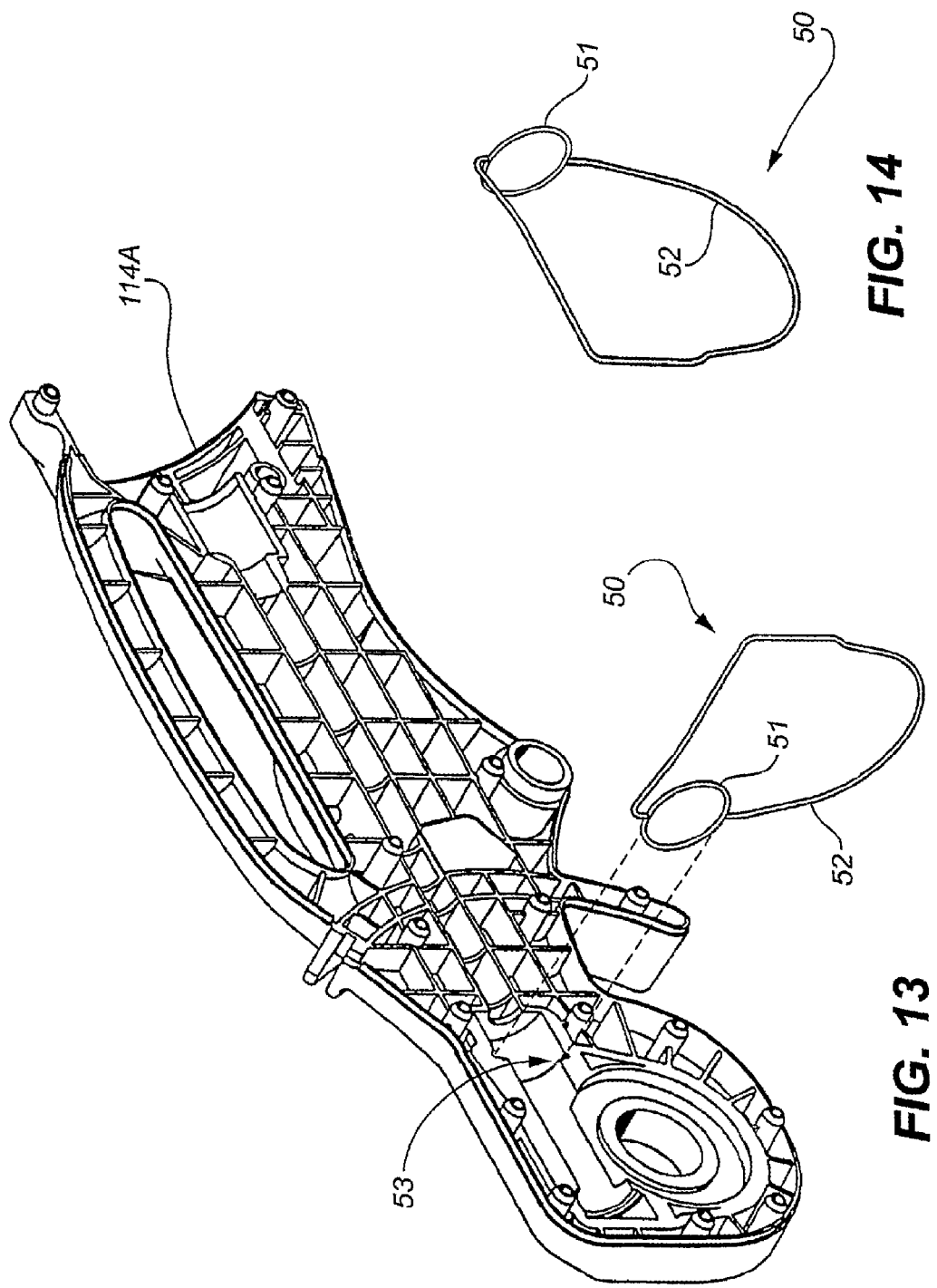

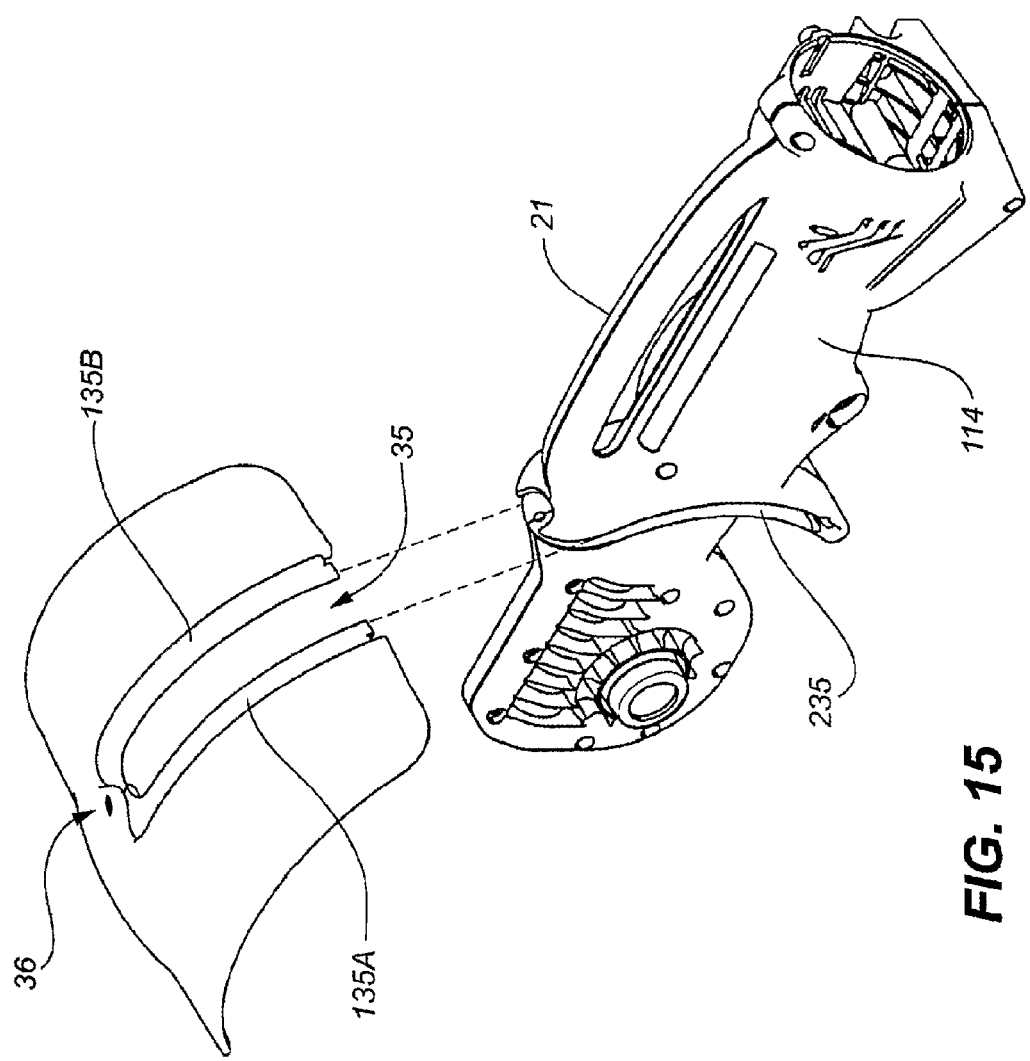

TILLER

CROSS REFERENCE TO RELATED APPLICATIONS

This application is a divisional of U.S. patent application Ser. No. 11/916,032, filed Nov. 30, 2007.

FIELD OF INVENTION

The present invention relates to garden tillers, and, in particular, to garden tillers powered by a small engine and intended to be operated by a single person.

BACKGROUND

In general, tillers have a number of tines which are mounted on a single horizontal shaft and rotated in order to provide a substantially slicing or scything action in which the tines cut through the soil in order to cultivate same. The vast majority of garden tillers, and in particular garden tillers intended for home use, are directly supported (and only supported) by their tines. Usually these tines are provided in a number of tine sets or tine groups.

Each set typically takes the form of a stamped metal "disk" with 4 to 6 tine "teeth." Typically each disc can only cut in one direction of rotation. Furthermore, each disc is typically attached to a hollow hub which slides over a horizontal shaft. The shaft in turn supports and rotates the tines. Such tine sets are typically keyed to the shaft by means of a dowel or pin which extends through a radial hole in the driving shaft and hollow hub of the tine set. In order to have such a radial hole or other through hole drilled through the shaft, the shaft needs to have a substantial diameter. A large diameter shaft is able to withstand the weakening effect of the through hole for the dowel or pin.

Alternatively, the tine disc is "keyed" to the shaft by means of a "D"-shaped aperture in the disc which mates with a machined flat on one side of the shaft. Again a large diameter shaft is required because the presence of the machined flat weakens the shaft. In addition, the need to machine such flats and shape such apertures adds to the cost and complexity of manufacture.

Each pair of tine sets is positioned so that each set lies to a corresponding side of the longitudinal centre line through the tiller. Such tillers typically include a detachable pair of spaced apart wheels which are detached prior to cultivation, and reattached afterwards for the purpose of wheeling the tiller from one cultivating location to another which is close by. For more distant transportation, such garden tillers are provided with one or two handles which extend transverse to the longitudinal axis of the tiller. Such handle(s) are for the purpose of permitting the tiller to be lifted into the trunk or boot of an automobile. Some prior art tillers intended for commercial use are provided with a single, fixed height, ground engaging wheel which is used for transport. Another prior art tiller has a pair of spaced apart ground engaging wheels which support the tiller both during transport and during cultivation as will be described hereafter in more detail. Another prior art tiller having a single wheel is known. However, the arrangement of the tiller is such that the entire weight of the tiller located between the wheel and the handles must be supported by the operator during cultivation. This is extremely tiring. If the tiller is not supported in this way, the tiller can accelerate away from the operator. In order to arrest this acceleration, it is necessary for the operator to lift the handles of the tiller.

In an effort to ensure that adequate tilling of the soil is achieved during cultivation, most tillers have been designed so that the weight of the engine acts to drive the tines downwardly into the soil. As a consequence, the operator in seeking to adjust the depth of penetration of the tines into the soil is required to counteract the gravitational force generated by the mass of the engine. In order to achieve this, tillers are always provided with two handles and it is generally necessary for the operator to walk behind the tiller with bent arms. The operator has to adjust the height of the tines by bending the arms whilst at the same time partially supporting the weight of the engine. This is very tiring.

Without exception, tillers have a housing which extends below the level of the shaft carrying the rotatable tines, and which houses a gear box or drive chain arrangement (or similar) which transmits the rotary motion of the engine to the shaft. This housing is normally centrally located on the shaft and there are equal numbers of tines on the left and right of the housing. As a consequence, the soil immediately below the housing tends to be less well cultivated than the soil to either side of the housing. Under some difficult soil conditions (e.g. hard clods, small hummocks, and the like) this inhomogeneous tilling action can be disadvantageous.

Searches after the priority date have disclosed various prior art arrangements.

FR 2316,852 MALIND FINANZ-ANSTALT and CH 520,461 KUNSTER both disclose a single wheeled mower with a hollow tubular shaft which extends in front of the mower and which terminates in a pair of reciprocating sets of horizontal mower blades. A drive mechanism for the mower blades extends through the hollow shaft, and one or more handles are located to the rear of the wheel. The centre of gravity is forward of the wheel so that the mower blades engage the grass if the operator does not hold the handles.

U.S. 2005/004537 STARK uses a pair of wheels to support the engine of a sweeper/cultivator in which the centre of gravity is forward of the wheels so that the sweeper drum engages the surface to be swept.

JP 08-224001 YANMAR AGRICULTURAL EQUIPMENT Co LTD discloses a tiller with a resistance rod for tilling and a trailing wheel for transport. The wheel and rod are rotatably mounted about a horizontal axis and one or the other is rotated downwardly to come into action whilst the other is rotated upwardly and out of the way. The centre of gravity of the tiller is forward of the trailing wheel.

SU 1128847 AS BELO TECH CYBERN (MISW) discloses a plough which is reciprocally mounted for fore and aft motion controlled by a hydraulic cylinder. The plough does not rotate but instead slides through the earth.

DE 2,555,525 FROLICH discloses a tiller with a spoked hub to set the cultivating depth. The spokes step over stones in order to not leave a rut in the tilled earth. The tiller engine is above the tines so the centre of gravity is forward of the spoked hub.

DE 4,210,816 BAUER discloses a tiller with a leading ground engaging wheel forward of the cultivating tines. The motor is positioned above the tines and a resistance rod is located at the rear.

FR 2,586,888 DENIS discloses a tiller with a leading ground engaging wheel and a tine axle located behind the front wheel. The tine axle extends to one side only of the longitudinal axle of the device.

U.S. Pat. Nos. 5,826,667 and 6,116,350 NOTARAS each disclose a lawn edger with a leading cutter blade assembly for edging grass growing over a concrete curb or pavement, a ground engaging wheel behind and the power unit to the rear of the wheel. The wheel is intended to roll along a sidewalk or footpath adjacent the edge of the lawn edge to be cut.

U.S. Pat. No. 6,516,598 NOTARAS discloses a vegetative trimmer similar to U.S. Pat. No. 5,826,667 but with a cutting head able to be rotated to cut either vertically or horizontally.

The genesis of the present invention is a desire to provide a different ergonomic arrangement for tillers and so to some extent lessen the abovementioned fatigue and permit a more homogenous tilling action to be achieved under difficult soil conditions.

SUMMARY

In accordance with a first aspect of the present invention there is disclosed a garden tiller comprising an elongate chassis steerable by a pair of spaced apart handles and supporting a power unit, a single ground engaging wheel means which is rotatable about a horizontal axis and which supports said chassis in the manner of a wheel barrow with said power unit and the centre of gravity of the tiller being between said ground engaging wheel means and said handles, at least two tines rotatable about an axis substantially parallel to, and in front of, said wheel axis with said tines being spaced apart on said tine axis, said chassis defining a central longitudinal axis of said tiller, said power unit and wheel lying substantially in a substantially vertical plane containing said longitudinal axis, and said handles and tines each being positioned with substantially equal corresponding spaces one to either side of said longitudinal axis, wherein simultaneously raising one of the said handles and lowering the other of said handles twists said chassis about said longitudinal axis to tilt said tine axis and thereby raise one of said tines and lower the other of said tines.

In accordance with a second aspect of the present invention there is disclosed a tine arrangement for an agricultural tiller, said arrangement having a plurality of tine groups, each said tine group comprising a pair of tines with each tine comprising an elongate central portion and each having a pair of upturned tips located one at each end of said central portion.

In accordance with a third aspect of the present invention there is disclosed a method of tilling ground comprising the tilling of soil by rotating tines in said soil, said method comprising the steps of:

(i) supporting said tines by a single ground engaging wheel means to determine the depth of cultivation; and (ii) adjusting the height of said tines relative to said soil by adjusting a support for said wheel means.

In accordance with a fourth aspect of the present invention there is disclosed a method of tilling soil using a tiller having a motor and a plurality of tines each rotatable in a substantially vertical plane, mounted for rotation about a substantially horizontal axis, and powered by said motor, said method comprising the steps of:

(i) supporting said cultivator with an arm located intermediate said motor and said axis and having a single ground engaging wheel means at a far end of said arm;

(ii) pivoting said arm to adjust its angle of inclination to the horizontal to thereby adjust the height of said tiller above said soil; and (iii) locking said arm into one of a plurality of positions.

In accordance with a fifth aspect of the present invention there is disclosed in an implement having a chassis, a ground engaging wheel means supporting said chassis, a pair of operating handles at one end of said chassis, at least one cutting blade at the other end of said chassis, and a power unit supported by said chassis and arranged to rotate said cutting blade(s), the improvement comprising a third handle extending at least part way along said chassis and located close to the centre of gravity of said implement.

In accordance with a sixth aspect of the present invention there is disclosed in an implement having a chassis, a ground engaging wheel means supporting said chassis, a pair of operating handles at one end of said chassis, at least one cutting blade at the other in the said chassis, and a power unit supported by said chassis, and arranged to rotate said cutting blade(s) via a gearbox located intermediate said engine and said blade(s), the improvement comprising forming said chassis from two longitudinally split components which form a housing for said gearbox.

In accordance with a seventh aspect of the present invention there is disclosed a blade cover for a garden tiller having a longitudinally extending chassis and a transversely extending shaft with a plurality of tines, said blade cover being substantially thin, being curved to lie in an arc spaced from the rotating tips of said tines, and being attached to said chassis by a single fastener which passes through an opening in said cover and into said chassis.

In accordance with an eighth aspect of the present invention there is disclosed an attachment for a tiller having ground breaking tines, said attachment comprising a substantially V-shaped tip located to the rear of said tines and shaped to form a furrow in ground tilled by said tines.

BRIEF DESCRIPTION OF THE DRAWING(S)

A preferred embodiment of the present invention will now be described with reference to the drawings in which:

FIG. 3 is a schematic view of a prior art hand truck or trolley.

FIG. 4 is schematic view of the hand truck of FIG. 3 tilted into the preferred operating angle.

FIG. 5 is a schematic view similar to FIGS. 3 and 4 but illustrating the operation of a prior art wheelbarrow.

FIG. 13 is a perspective view of one half of the chassis of FIG. 12 and illustrating a dual loop seal and its installation.

FIG. 14 shows the changed configuration of the seal of FIG. 13 after installation.

FIG. 15 is an exploded perspective view of the chassis and protective tine guard.

DETAILED DESCRIPTION OF THE PREFERRED EMBODIMENT(S)

Figure 1:
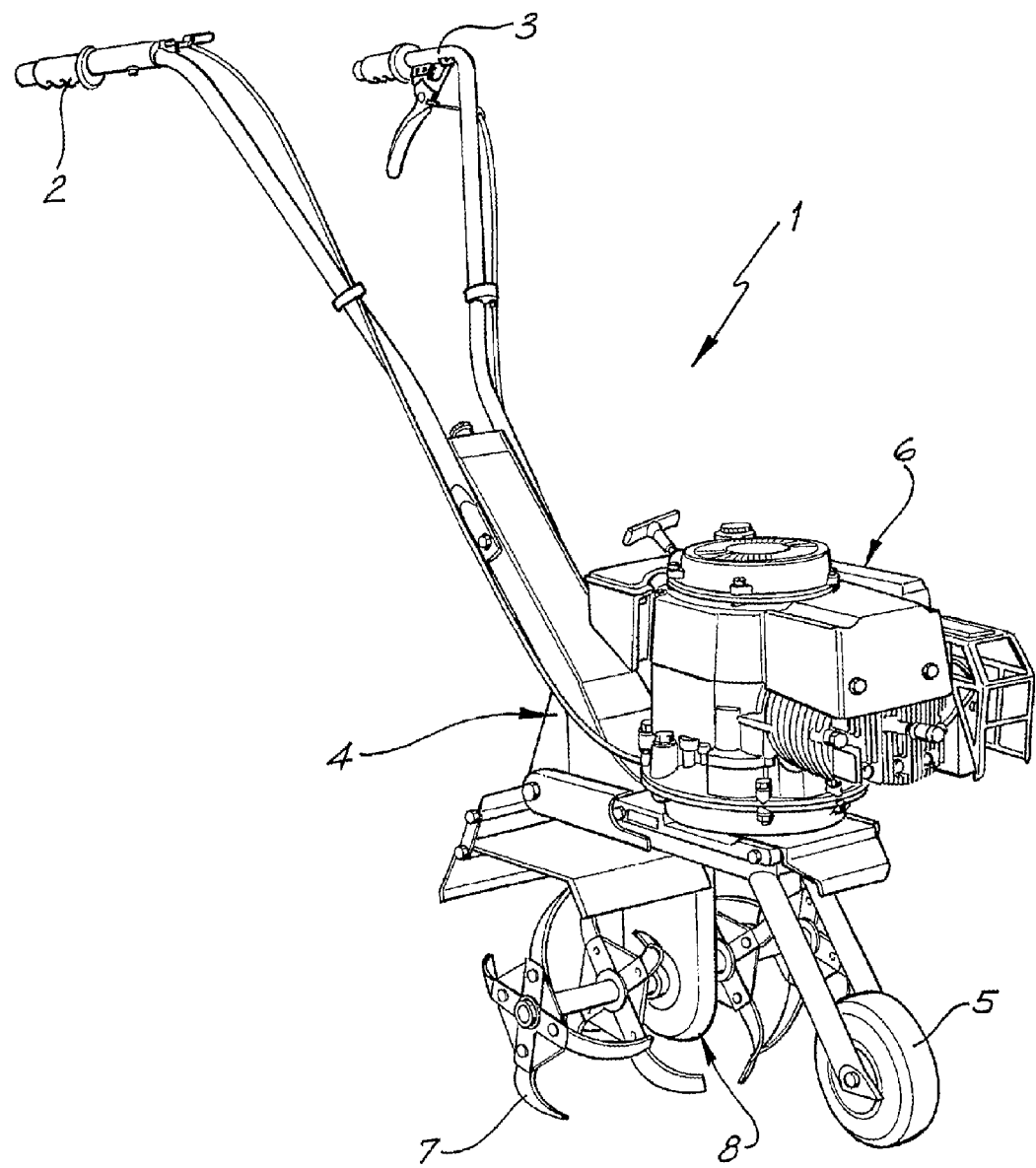
FIG. 1 is a perspective view of a prior art tiller having a single, fixed height, ground engaging wheel.

As seen in FIG. 1, a prior art tiller 1 has a pair of elevated handles 2, 3 which extend from a chassis 4. The chassis 4 is supported by a ground engaging wheel 5 of fixed configuration. A heavy lawn mower gasoline engine 6 is mounted on the chassis 4 and drives tines 7 in order to cultivate or till soil in known fashion. A housing 8 separates the tines 7 and covers a gear box or drive chain (not illustrated) which interconnects the engine 6 and tines 7.

The configuration of the prior art tiller 1 of FIG. 1 is somewhat similar to that of a wheelbarrow in that the ground engaging wheel 5 leads the handles 2, 3 bring up the rear, and the weight of the engine 6 (plus ancillary equipment such as tines 7, gearbox 8, and chassis 4) is positioned between the wheel 5 and the handles 2, 3. As a consequence, in order to be wheeled about, and even during the cultivating process, this weight of the engine 6 and ancillary equipment must be at least partially supported by the bent and uplifted arms of an operator (not illustrated). In particular, the degree of penetration of the tines 7 into the soil is governed by the flexing of the elbows of the operator, again while the weight of the engine and ancillary equipment is at least partially supported. As explained above, a tiller is effectively "self propelled" because of the tendency of the tines to "walk" over the surface of the soil. Thus the operator of the tiller 1 has to continuously "fight with" or pull rearwardly on the handles 2, 3 in order to limit the forward motion and thereby force the tines into the soil. As a consequence, the operation of such a tiller 1 is extremely tiring. In particular, the tiller is unsuitable for operation by women, youngsters, and the elderly who lack the necessary physical strength to "man-handle" the implement.

Figure 2:
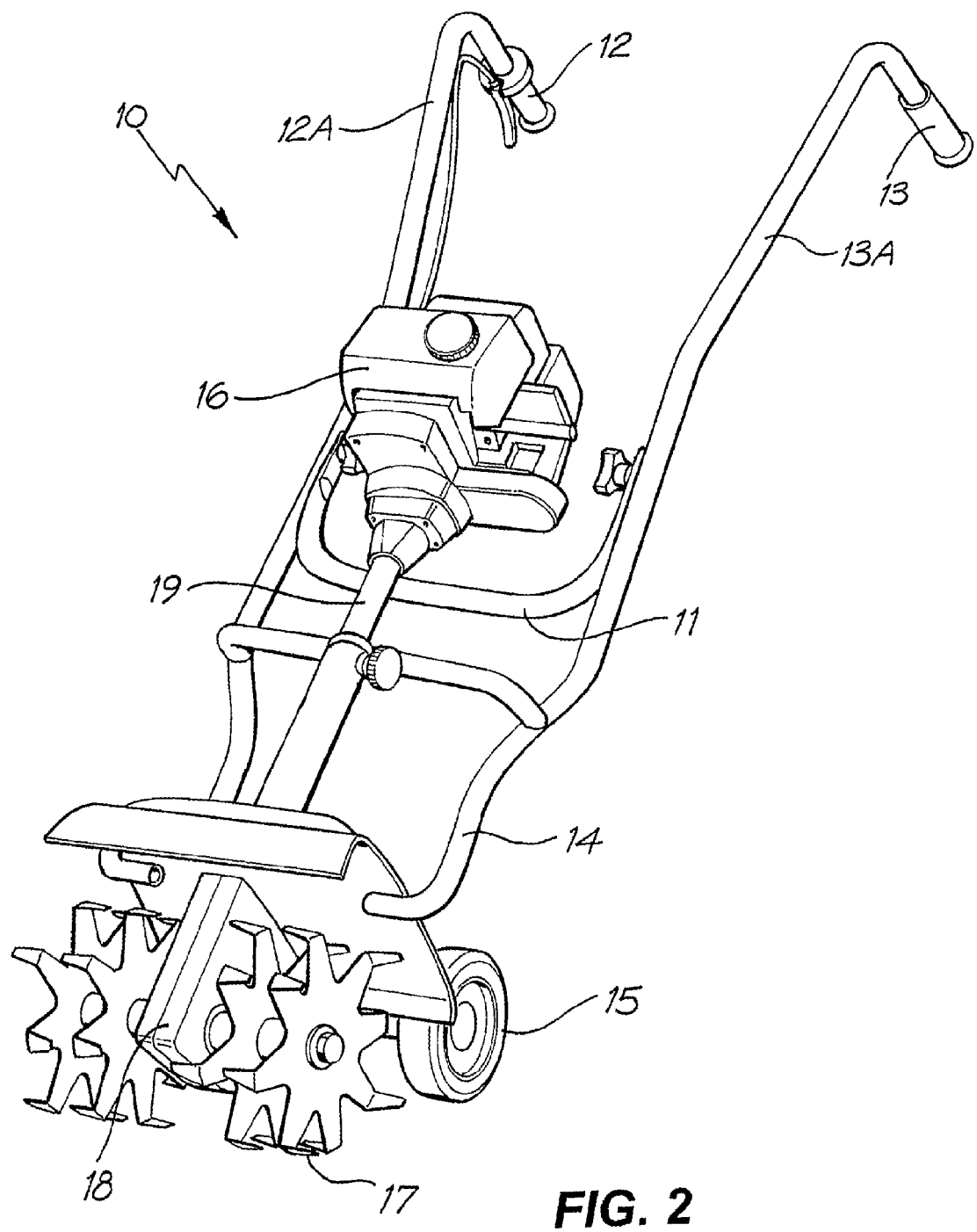
FIG. 2 is a perspective view of a prior art tiller having dual wheels.

Another prior art tiller 10 is illustrated in FIG. 2. Elevated handles 12, 13 are provided which are steeply and downwardly angled from the handle stems 12A and 13A. The handle stems 12A and 13A are joined by a cross-brace 11 which is located in front of the engine, to form a frame 14 which is supported by a pair of spaced apart ground engaging wheels 15 which rotate about a horizontal axis. Only one of the two wheels 15 is illustrated in FIG. 2. The elevated handles 12, 13 being downwardly angled from the handle stems 12A and 13A are thus not aligned with the longitudinally extending frame 14.

Located in front of the wheels 15 are tines 17 which are rotatable about a horizontal axis. The tines 17 are rotated by an engine 16 which is located at the rearward end of a drive shaft 19. As before, a housing 18 separates the tines 17 and covers the interconnecting tubing extending from the engine 16 to the horizontal shaft on which the tines 17 are mounted.

Due to the handles 12, 13 being downwardly inclined, in use the handle stems 12A and 13A, together with the frame 14, are inclined at a relatively steep angle to the horizontal. The weight of the tiller 10 is forward of the wheels 15 in operation thereby driving the tines 17 into the soil. The depth of penetration of the tines 17 into the soil is controlled by the operator adjusting the height of the handles 12, 13 above the soil. This puts a significant physical load on the arms of the operator and is therefore tiring. There is a crude adjustment mechanism which adjusts the length of the member interconnecting the frame 14 and wheels 15. However, this adjustment mechanism cannot, in practice, be adjusted without switching off the engine since the adjustment screws to be manually manipulated are very close to the tines 17. Thus, in practice, operators adjust their arms to adjust the tilling depth, rather than be forced to switch off the engine.

An additional problem with the prior art tiller 10 of FIG. 2 is that the housing 18 creates a strip of untilled soil since it extends substantially below the level of the horizontal axis about which the tines 17 rotate. The presence of the dual spaced apart wheels 15 means that this axis remains horizontal and is, in practice, not able to be tilted sideways during operation of this prior art tiller 10.

The prior art tiller 10 of FIG. 2 is manipulated in a manner similar to the way a trolley or hand truck 90, illustrated in FIGS. 3 and 4, is manipulated. In FIG. 3 it will be seen that the hand truck 90 if its handle 91 is held at a steep angle, can be arranged so that the weight (Mg) of the cargo is forward of the axis of the rotation of the wheels 95. Alternatively, if that handle 91 is held at a less steep angle, as indicated in FIG. 4, then the weight of the cargo is just rearward of the axis of rotation of the wheels 95.

These physical characteristics of the tiller 10 and hand truck 90 are quite similar but are quite different from the physical characteristics of a conventional wheelbarrow 95 which are depicted in FIG. 5. For the wheelbarrow 95, the weight of the load (Mg) is located well to the rear of the axis of rotation of the wheel 99. Furthermore, the handles 98 are nearly horizontal and only slightly inclined so that the operator holds them with straight arms which are able to supply the upwards force H.

Figure 12:
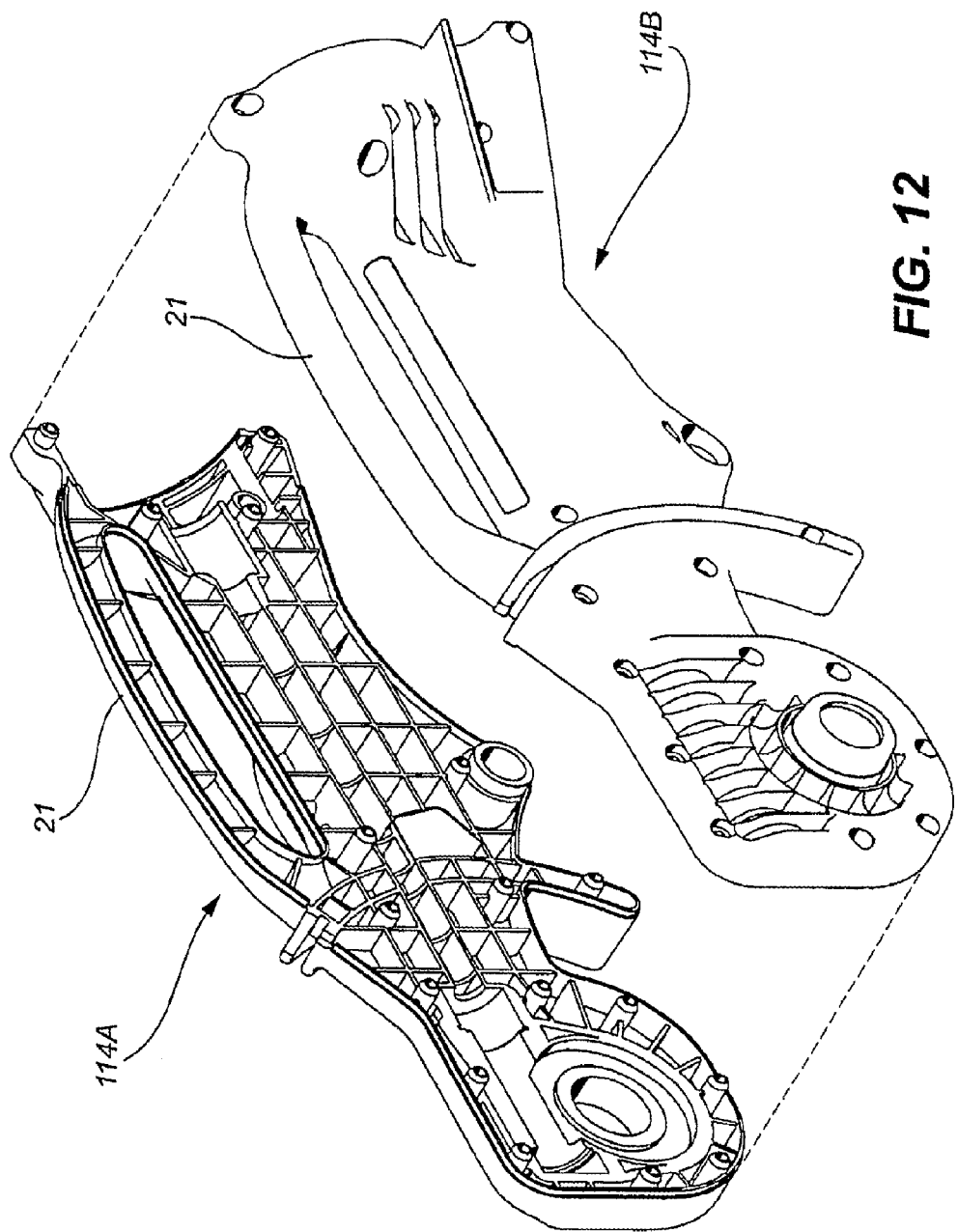
FIG. 12 is an exploded perspective view of the longitudinally split chassis and housing.

Turning now to FIGS. 6-15, the tiller 100 of the preferred embodiment is illustrated which has handles 112, 113 which are interconnected by means of a cross brace 111. The handles 112, 113 are connected directly to a chassis 114. The handles 112, 113 are not downwardly inclined but instead are substantially longitudinally aligned with the chassis 114. The chassis 114 is preferably longitudinally split to enable the chassis 114 to be molded into two substantially mirror image components, 114A and 114B (as best seen in FIG. 12).

Thus, as will be apparent hereafter, the chassis 114 has a monocoque construction which also forms a housing which functions as a gearbox 118.

Figure 8:
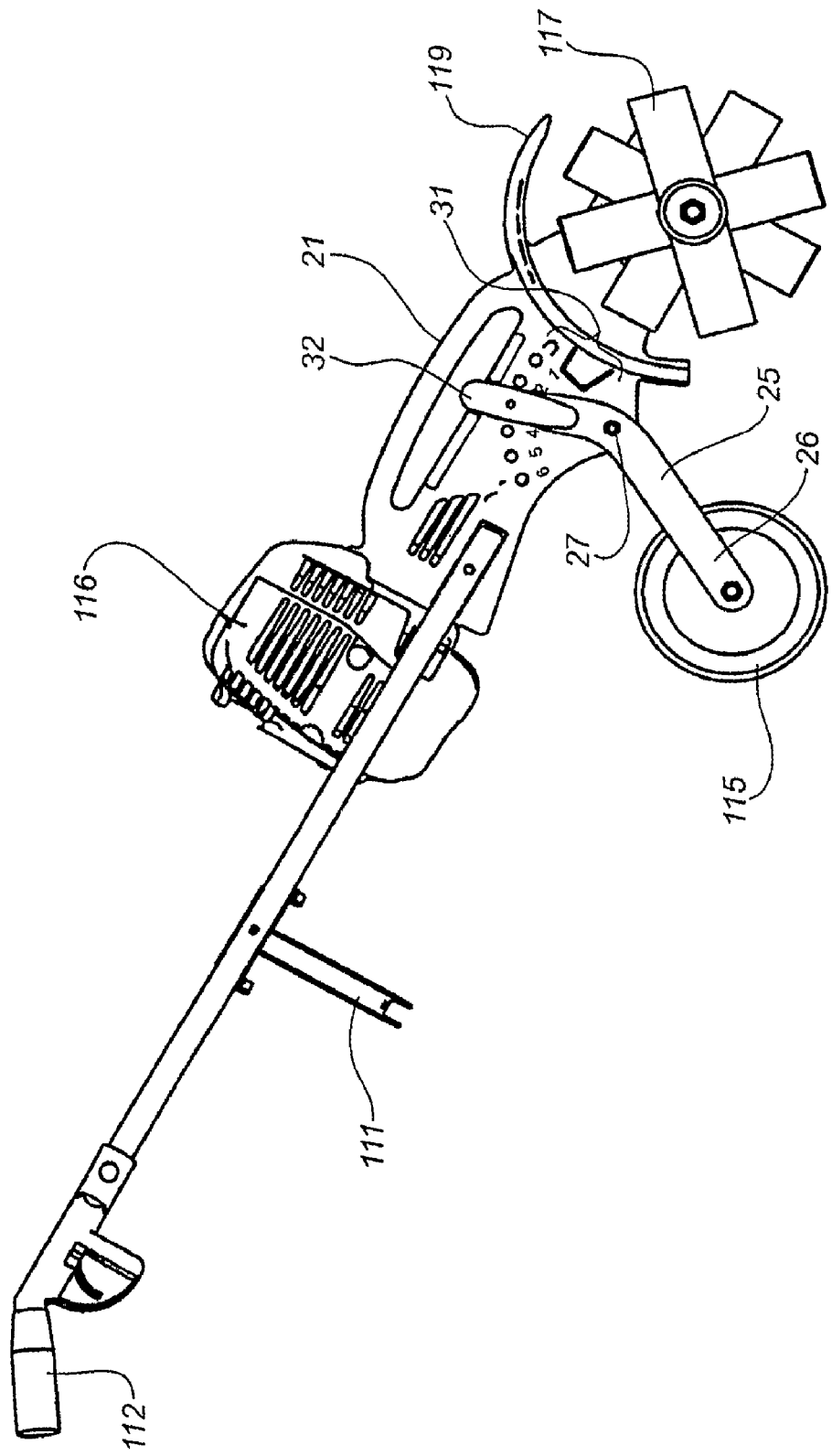
FIG. 8 is a side elevation of the tiller of FIG. 6 in use.

As best seen in FIG. 8, the tiller 100 is supported by a ground engaging wheel 115 which is rotatably mounted about a horizontal axis at the distal end 26 of an arm 25 which is pivoted approximately at its centre 27 to the chassis 114. Thus the chassis 114 is of adjustable height which is easily determined by moving a resettable setting handle 32. The wheel 115 rotates in a substantially vertical plane which substantially includes the longitudinal axis of the chassis 114.

Figure 6:
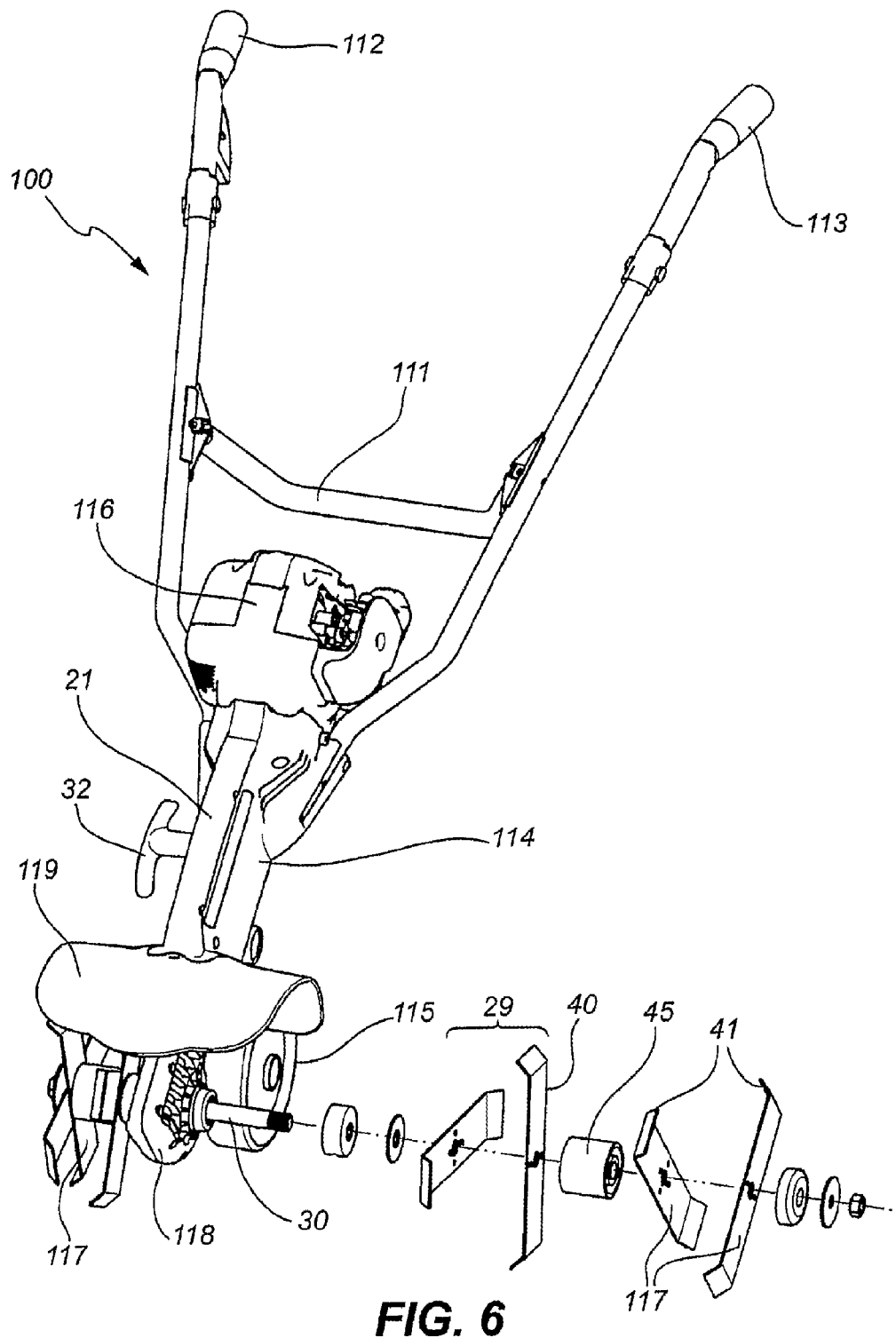
FIG. 6 is a partially exploded perspective view of the gasoline powered tiller of the preferred embodiment of the present invention.
Figure 6A:
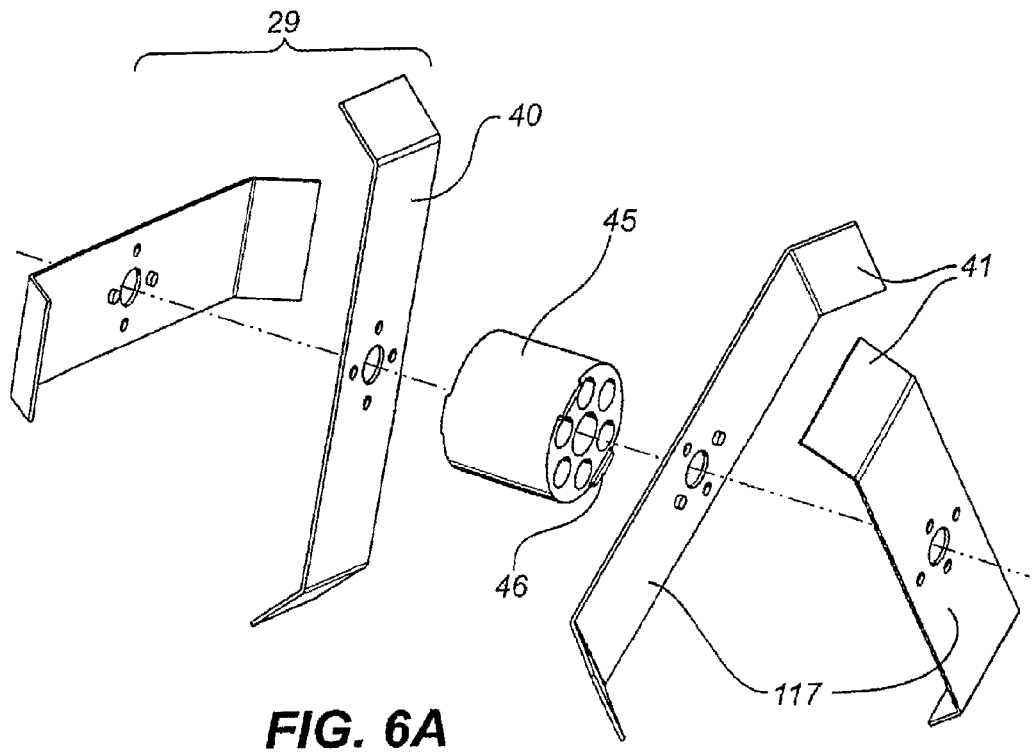
FIGS. 6A and 6B are perspective views of the tines and spacer of FIG. 6, but to a larger scale.

As best seen in FIG. 6, the tiller 100 of the preferred embodiment is provided with eight tines 117 which are arranged in four groups 29 on a shaft 30 which is powered by a small, and thus lightweight, gasoline engine 116. Alternatively, an electric motor can be used as the power source. The engine 116 is located at the handle or rear end of the chassis 114 with the engine shaft preferably being aligned with the longitudinal axis of the chassis 114. Extending over the tines 117 is a tine guard 119 which is connected to the chassis 114. Intermediate the tine guard 119 and the engine 116 is an elongate longitudinally extending dorsal handle 21 (FIG. 8) the opposite ends of which mould with the chassis 114. The dorsal handle 21 preferably has a sufficient longitudinal extent to enable two human hands to be placed side by side on the handle 21. This handle configuration is desirable for permitting the tiller 100 to be easily lifted into the boot or trunk of a motor vehicle or automobile especially by elderly or frail persons who prefer to use a tiller in preference to a manual implement such as a spade or mattock. The longitudinal handle 21 is formed by the juxtaposition of the two chassis components 114A and 114B. Thus the handle 21 is integral with the chassis 114.

The arm 25 is able to be pivoted relative to the chassis 114 in order to set the height of the chassis 114, and hence the shaft 30, above ground level during cultivation. For this purpose the arm 25 is provided with a releasable setting handle 32 (FIG. 6) which is resiliently biased by a compression spring, or similar, and thus is able to be set at a number of positions each determined by a corresponding aperture 33 (FIG. 11) in the chassis 114. For the purposes of storage, and for initial packaging, the wheel 115 is able to be pivoted into the storage position illustrated in FIG. 10.

In addition, in order to prevent the possibility of the hand of the operator whilst holding the setting handle 32, striking the tine guard 119, a safety latch arrangement 31 is provided between the setting handle 32 and the chassis 114. The latch arrangement 31 must be specifically released before the setting handle 32 can be moved beyond its most downward operating position (labeled 1 in FIG. 11). The safety latch arrangement 31 includes a unidirectional ramp 38 formed on the outer side of a resilient protrusion 39. The setting handle 32 is unable to move beyond the blunt end of the ramp 38 thereby providing a gap between the setting handle 38 and the tine guard 119. To place the tiller into a locked compact storage configuration for transport in an automobile, for example, the ramp 38 is pushed inwardly thereby depressing the protrusion 39 and allowing the setting handle 32 to move past the ramp 38. This locks the wheel 115 against the chassis 114. To move out of this locked transport storage configuration, the setting handle 32 is pulled outwardly, the arm 25 is then freed and is thus able to be moved towards the engine 116, thereby allowing the setting handle to ride over the ramp 38.

The tine guard 119 is illustrated in FIG. 15 and has an elongate slot 35 which accommodates the chassis 114. The slot 35 is provided with two longitudinally extending flanges 135A and 135B. These flanges mate with a generally U-shaped slot 235 (only half of which is visible in FIG. 15). The guard 119 also has a single aperture 36. A fastener such as a conventional screw, bolt, dowel, pin or the like can be passed through the aperture 36 into the chassis 114 in order to secure the tine guard 119 in its operating position illustrated in FIG. 11. Preferably, a quick release fastener such as a spring loaded pin having a handle grip to lift the pin against the resistance of the spring is used. This enables the tine guard 119 to be quickly and easily removed to enable fibrous material such as grass runners to be manually cleared from the (stationary) tines 117.

Figure 6B:
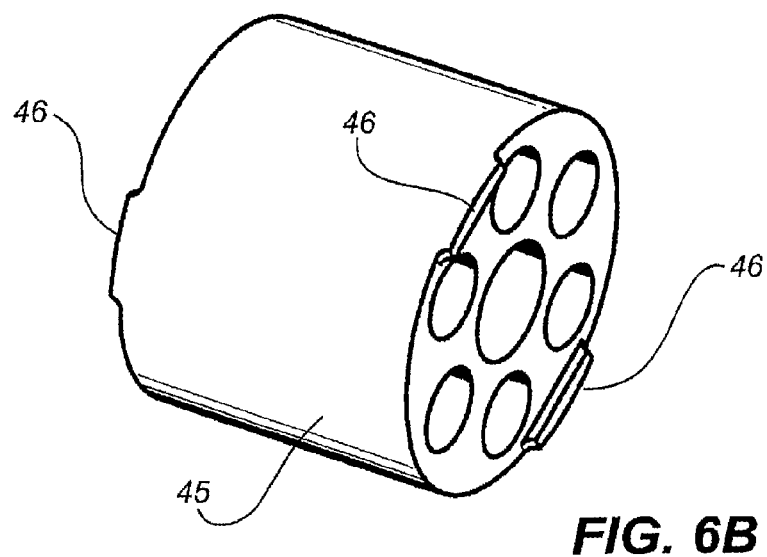
Figure 7:
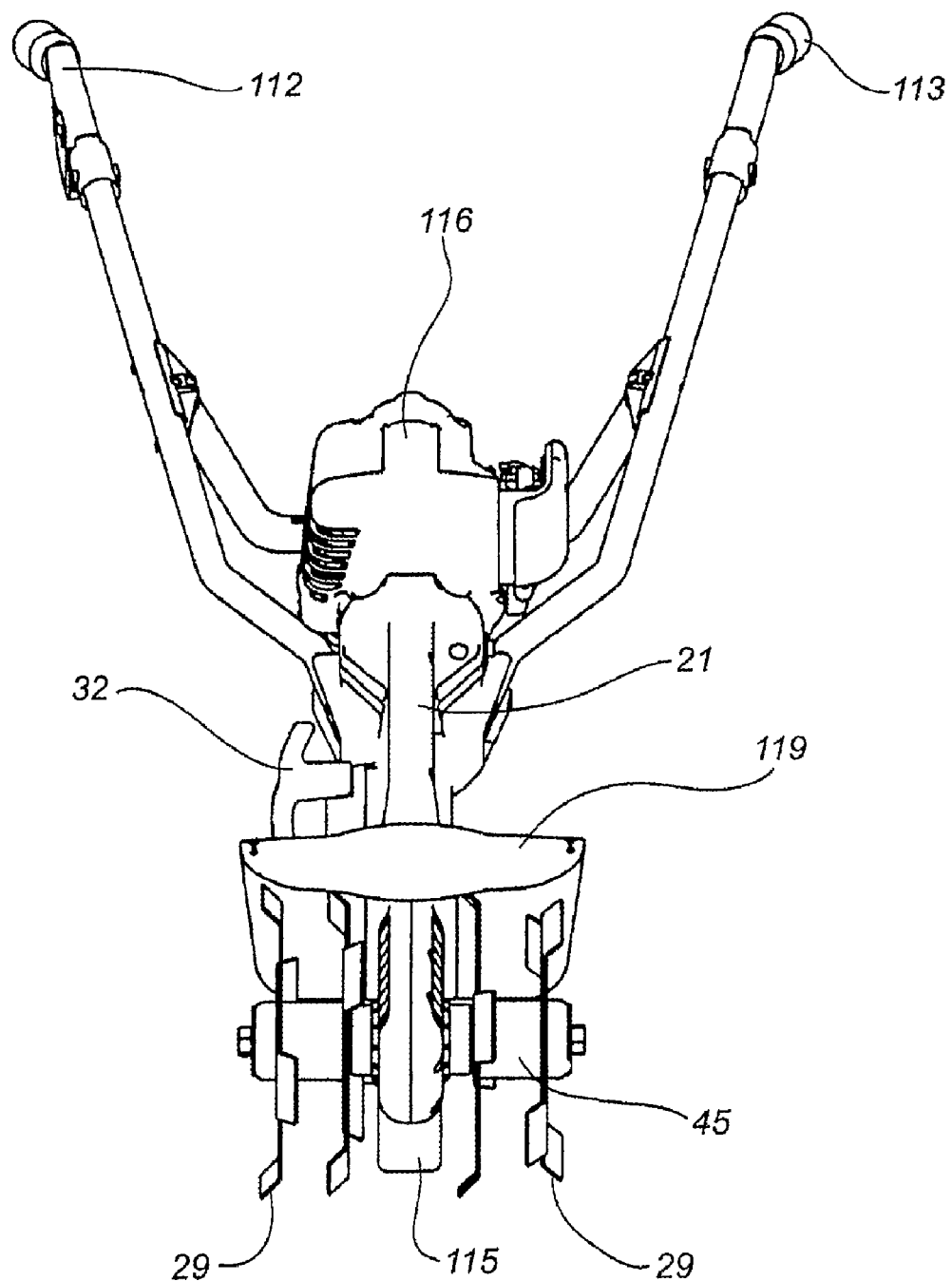
FIG. 7 is a front elevation of the tiller of FIG. 6 in use.

Returning now to FIGS. 6-6B, each of the tines 117 is preferably formed from a single strip of preferably hardened spring steel which is shaped into a generally U-shaped configuration. Each tine 117 has a central blade portion 40 and a pair of blade tips 41. The blade tips 41 together with the central portion 40 form the generally U-shaped blade configuration. Two such tines 117 are mounted in opposing configuration as illustrated in FIG. 6 in order to form a single tine group 29. In the illustrated embodiment there are four tine groups 29 in total with a total of eight tines 117. However, the number of tines and tine groups can be increased or decreased, if desired. For example, six tine groups will cultivate a wider strip than the illustrated four tine groups 29. However, a wider tine guard 119 is required. Furthermore, each pair of tines 117 can be mounted either with the blade tips 41 facing each other and inclined towards each other, as illustrated, or with the blade tips 41 facing away from each other and inclined away from each other. In this way, various blade configurations are possible.

The central portion 40 of each tine 117 is preferably provided with a registration mechanism, such as a partially punched protrusion, which mates with a corresponding recess formed by a like partially punched protrusion or hole in the mating tine 117. Thus, each tine 117 is preferably identical, therefore resulting in a low cost of production. For further detail in this connection the present applicants' U.S. Pat. No. 6,179,059 provides further information.

On each side of the tiller, the corresponding pairs of tine groups 29 are separated from each other by means of a corresponding relatively thick cylindrical spacer 45 of metal or plastics material, preferably glass filled nylon, glass filled polypropylene, or the like. It is preferable for there to be a keying mechanism associated with each spacer 45 to maintain the intended angular separation of adjacent tine groups 29 on each side of the gearbox 118. This angular separation is preferably approximately 45 degrees. The preferred keying arrangement is four protruding ribs 46 arranged in two pairs. The ribs 46 engage the side edges of the central portions 40 of the tines 117 and maintain the desired orientation. Other arrangements will be apparent to those skilled in the art, such other arrangements including shaped recesses in the end faces of the spacer 45, one or more off-centre line pins which engage with corresponding recesses or holes in the tines 117, or protuberances on the tines 117 which engage with recesses in the spacer 45.

The entire assembly is held in compression, but not overly tightly, by means of nuts which engage the oppositely handed threaded ends of the shaft 30. One end of the shaft 30 has a left hand thread and the other end has a right hand thread. These threads rotate in the same direction and because of the rotation of the shaft 30, the nuts at the shaft ends are self tightening to compress the low cost tine assembly. This compression is sufficient to drive the tine groups 29 and also provides a release mechanism of sorts if the tines should hit a hard object such as a buried pipe. The spacers 45 also maintain the spacing of the tine groups 29 so as to ensure an even and uniform cultivation.

The above overall arrangement of the tines 117 gives rise to two advantages. Firstly, the shaft 30 for the tines does not have any (generally radial) through holes to receive cotter pins, or the like, to space and/or key the tines 117. Thus the shaft 30 can be thin (without loss of strength) and is inexpensive to fabricate. Again, absence of any machined flats and corresponding "D"-shaped apertures results in an inexpensive arrangement. Secondly, the large diameter spacers 45 held in compression function as a shaft of relatively large diameter. Thus the spacers 45, together with the nuts which hold them in compression, provide considerable additional stiffening for the shaft 30.

Other arrangements of the tines 117 are possible. In one such arrangement, each tine is formed from a straight blade. The tines are arranged in four groups with each group being formed from two blades set at an angle of approximately 90 degrees. Another arrangement is a pair of blades, one of which is a straight blade and the other one of which is a curved or bent blade such as tine 117. Again these pairs of blades are preferably arranged in four groups with each group being formed from a pair of blades. Other variations are possible depending on soil types and soil conditions.

As seen in FIGS. 12, 13 and 14, the chassis 114 is fabricated in two parts 114A and 114B with the chassis 114 including both the dorsal handle 21 and the housing 118. The chassis 114 encloses the clutch drum, the drive shaft, and the 90 degrees output shaft gear arrangement (all not illustrated) which rotate the shaft 30. In order to seal the gear arrangement a dual loop seal 50 is provided. The seal 50 is fabricated in the planar configuration illustrated in FIG. 13 and has an O-ring portion 51 and a peripheral seal portion 52.

In order to install the seal 50, the O-ring portion 51 is installed around a sealed bearing or a separate oil seal or the like, on the leading end of the drive shaft at 53 and thereby retains the configuration illustrated in FIG. 13. Then the peripheral seal 52 is turned to lie in a plane perpendicular to that illustrated in FIG. 13 so that the seal 50 has the configuration illustrated in FIG. 14. Then the peripheral seal 52 is positioned at location 54. Next the two halves 114A and 114B of the chassis 114 are brought together. In this way a continuous seal is provided by a single component instead of two individual abutting seals being required. An alternative is to install the O-ring portion 51 at 53 around the drive shaft at its leading end.

It will be apparent from FIG. 8, in particular, that the weight of the engine 116 is located substantially to the rear of the ground engaging wheel 115 and, as a consequence, the weight of the handles 112, 113 is reasonably balanced with the weight of the tines 117. As a result, the operator does not have to fight the weight of the engine 116 in operation. Furthermore, during operation the penetration depth of the tines 117 is easily able to be adjusted or set by means of the spring loaded setting handle 32 and the pivotable arm 25. Although the handles 112, 113 with their anti-slip grips are normally held by the operator having his arms substantially straight at the elbow, since the setting handle 32 position determines the depth of penetration of the tines 117, the load on the handles 112, 113 is basically balanced. Therefore the operator need only to support a very light weight.

Figure 9:
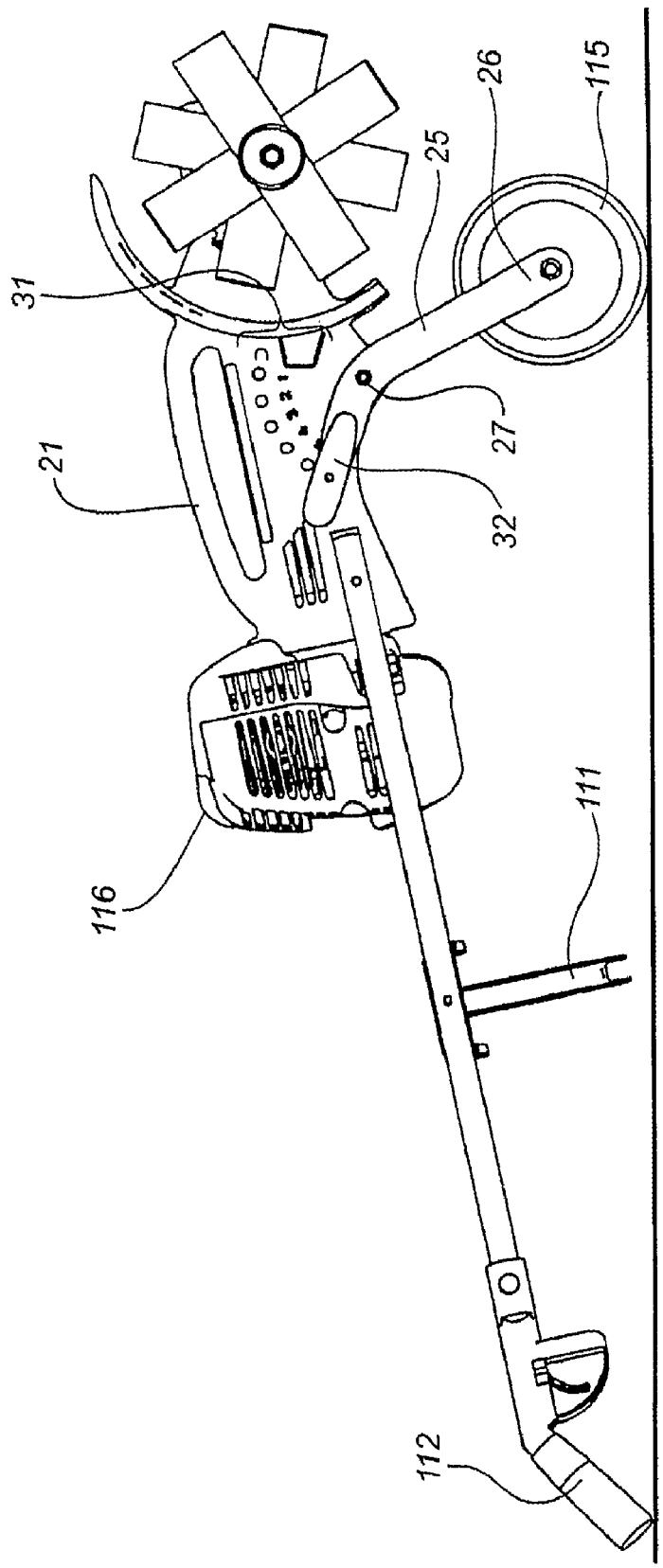
FIG. 9 is a side elevation of the tiller of FIG. 6 in the "engine start" position.
Figure 10:
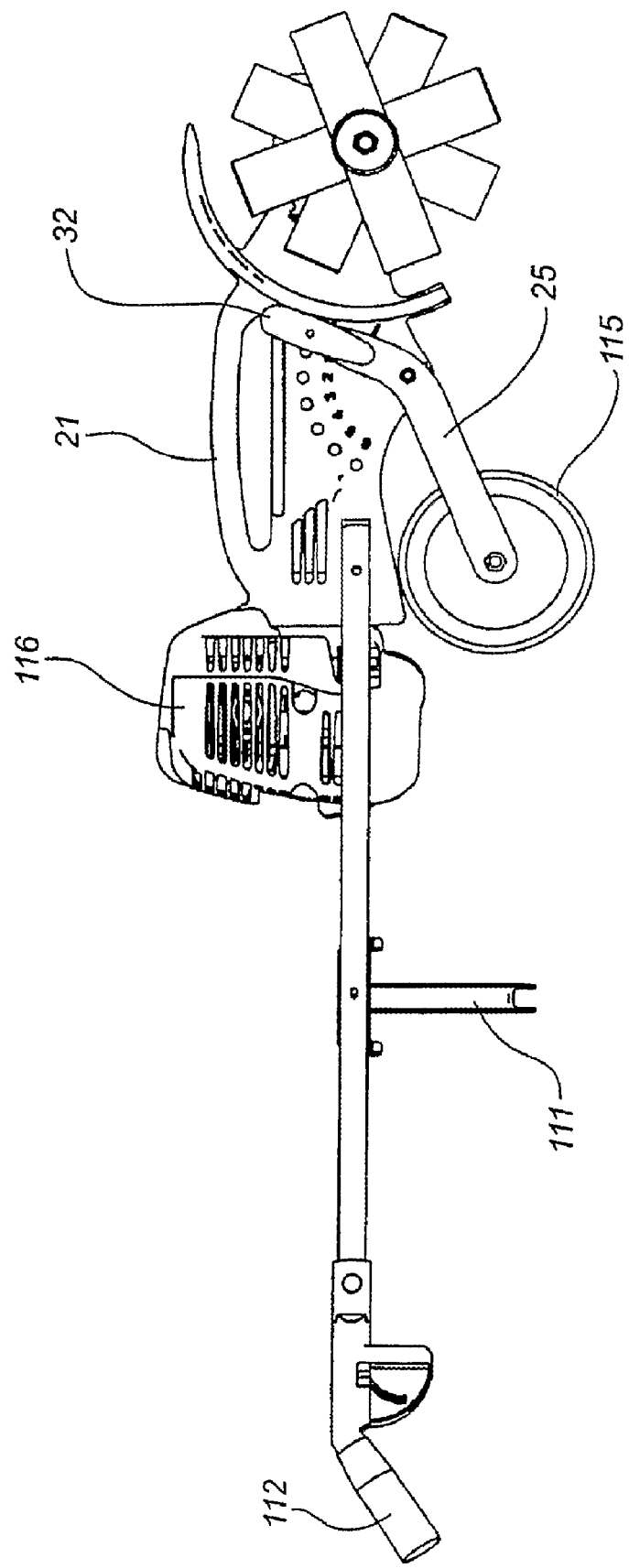
FIG. 10 is a side elevation of the tiller of FIG. 6 with the wheel moved into the storage configuration.
Figure 11:
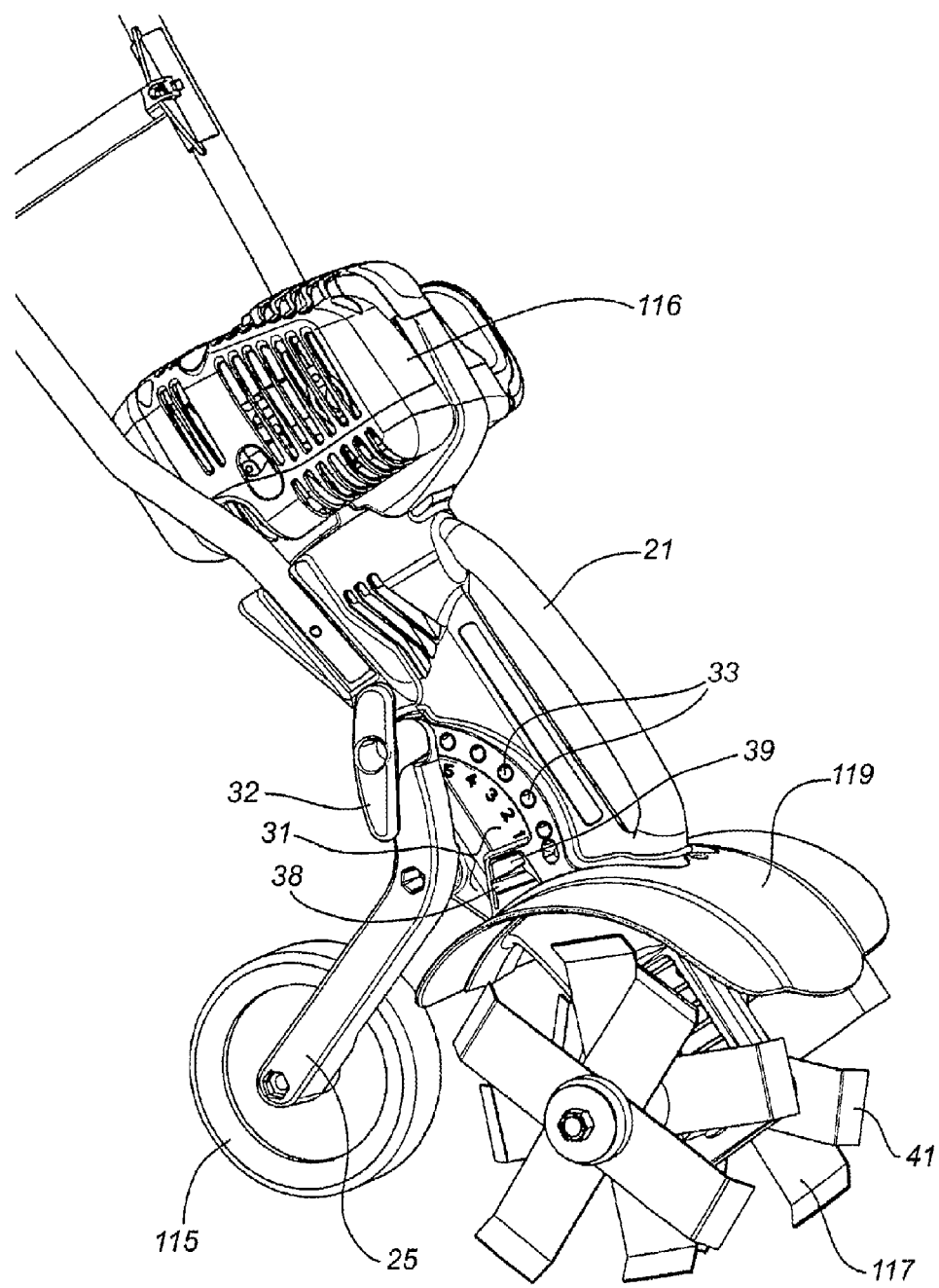
FIG. 11 is a perspective view of the forward portion of the tiller of FIG. 6 to an enlarged scale.

There is a slight downward weight on the handles 112, 113 since it is desired that if the operator should inadvertently drop, or let go of, the handles 112, 113 then the handles 112, 113 descend downwardly onto the ground as illustrated in FIG. 9. The two handles 112, 113 plus the ground engaging wheel 115 provide a stable three point engagement between the tiller 100 and the ground which does not permit the tiller 100 to roll or tilt. The tines 117 in this configuration rotate harmlessly in the air but are well clear of the operator. Consequently, this is the configuration in which the tiller should be placed in order to pull the starting cord of the engine 116. In this activity the operator places one foot on the cross brace 111. This is an extremely safe and very stable position in which to start the tiller 100. As will be appreciated from FIG. 9, the cross brace 111 is close to, or touches, the ground and so can provide additional stability should one of the handle grips enter a rut, hollow or similar depression in the ground.

A similar configuration is illustrated in the present applicants' earlier U.S. Pat. No. 5,826,667 which discloses a lawn edger, and U.S. Pat. No. 6,516,598 which discloses a powered vegetative cutting device. Although a similar configuration of handles, engine and wheels is disclosed in these earlier patent specifications, in respect of a tiller different considerations apply. For example, a further particular advantage of the tiller 100 of the preferred embodiment is that when tilling and with the engine idling, the clutch is not engaged and thus the tines 117 do not rotate. However, the tines 117 and their tips 41 are engaged with the soil being tilled.

Therefore, with the tines 117 engaged with the soil and the engine idling, the operator can let go of both handles and the tiller 100 will not fall over. This enables an operator to blow his or her nose, adjust his or her glasses, answer a mobile (cell) phone etc., and then immediately return to the tilling action. This is quite different from the implements of U.S. Pat. Nos. 5,826,667 and 6,516,598.

Furthermore, the ability to twist the tiller 100 about its longitudinal axis results in the shaft 30 being reciprocated through an arc in a substantially vertical plane so as to move the tines 117 up and down in an arc relative to the ground. This enables the tines 117 to cultivate the soil directly underneath the housing 118. This reciprocating sideways tilting motion can avoid the need for a return pass over the tilled soil, especially in difficult conditions (e.g. hard clods of soil, hummocks and uneven ground, etc).

Figure 16:
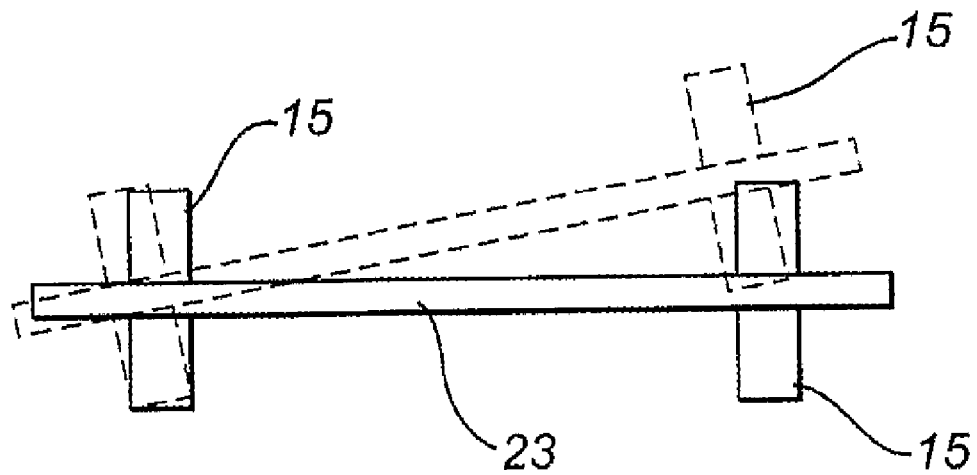
FIG. 16 is a schematic front elevation of the shaft and wheels of the prior art tiller of FIG. 2.
Figure 17:
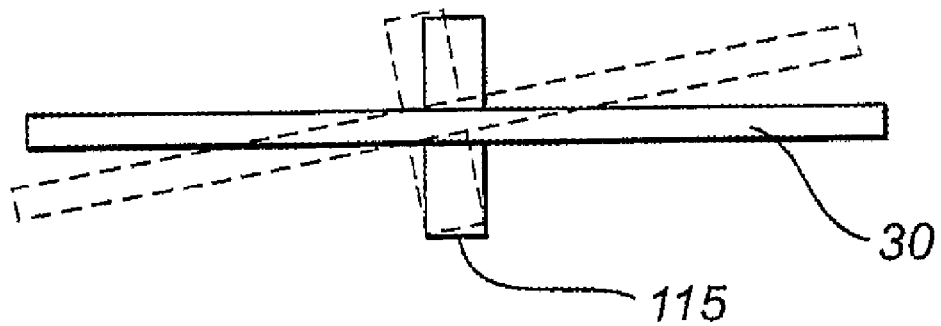
FIG. 17 is an equivalent view of the shaft and wheel of the tiller of FIGS. 6-15.

The mechanical advantage of the tiller 100 of the preferred embodiment over the prior art machine of FIG. 2, can be appreciated from a consideration of FIGS. 16 and 17. In FIG. 16 the prior art tiller is illustrated with its pair of spaced apart wheels 15. Positioned in front of the wheels 15 is the shaft which carries the tines 17 (FIG. 2).

In order to try and achieve the abovementioned sideways tilting motion, it is necessary for the handles 12, 13 to be twisted so as to tilt the entire tiller 10. The tilted position is illustrated by broken lines in FIG. 16. It will be seen that even with only a small inclination of the shaft 23, one of the wheels 15 is required to be elevated above ground level to a substantial degree. This requires a very considerable force to be applied to the handles 12, 13. So in practice this tilting is never achieved, and especially for appreciable periods of time.

Furthermore, it will be appreciated from FIG. 2 that the spacing between the wheels 15 is similar to that of the spacing between the outer tines 17. As a consequence, during any attempt to tilt the cultivator of FIG. 2 the lower one of the wheels 15 limits the extent to which the outer tines 17 on that side of the tiller, can penetrate the soil. This is a significant disadvantage.

This is to be contrasted with the identical situation illustrated in FIG. 17 for the tiller 100 of FIGS. 6-15. Here the shaft 30 is easily inclined in either direction to the same extent as indicated in FIG. 16, merely by applying an easy sideways tilt to the tiller 100 which pivots the frame 114 about the lowermost part of the rim of the single wheel 115. This requires no lifting, no major force, and merely a slight tilting of the handles 112, 113. Thus the above described reciprocating tilting motion is easily achieved. As a consequence, the soil directly underneath the housing 118 can be easily cultivated by the tines 117. This is a significant advantage over the prior art tillers. Furthermore, there is nothing to limit the degree of penetration of the soil by the tines 117 because of the increased maneuverability of the tiller 100 of FIGS. 6-15.

In addition, all this is able to be accomplished by the operator with downwardly directed extended or downstretched arms because of the wheelbarrow like configuration of the tiller 100. This is to be contrasted with the prior art cultivator 10 of FIG. 2 in which the arms of the operator are bent upwardly during operation. Similarly, the prior art tiller 1 of FIG. 1 is also operated with bent arms and suffers from the disadvantage of being difficult to maneuver.

Additionally, the tiller of the preferred embodiment has a still further advantage which arises from the height adjustment mechanism including arm 25. The ability to adjust the height of the tiller 100 above the soil means that the depth of cultivation is also adjustable. In particular, very deep cultivation is possible with the tiller set to the lowest height above the soil. In this connection, a comparison of FIGS. 8 and 10 indicates that with the arm 25 set to place the tines 117 in their lowermost operating position, and the handles 112 held with downwardly directed straight arms, the tines 117 can cut very deeply into the soil.

Additionally, the convenient handle height of the handles of the tiller 100 of the preferred embodiment during operation means that the operator, should it be necessary, can easily raise the handles to still further lower the tines, thereby permitting a still further increase in the depth of cultivation to an extreme depth. Although the prior art tiller of FIG. 2 can have its tines lowered by raising the height of the handles above the ground, because the normal operating height of the handles is much higher than the tiller of the preferred embodiment, the range of this manipulation of the FIG. 2 tiller is much more limited than for the tiller 100 of the preferred embodiment because of the FIG. 2 tiller's different geometry.

Figure 18:
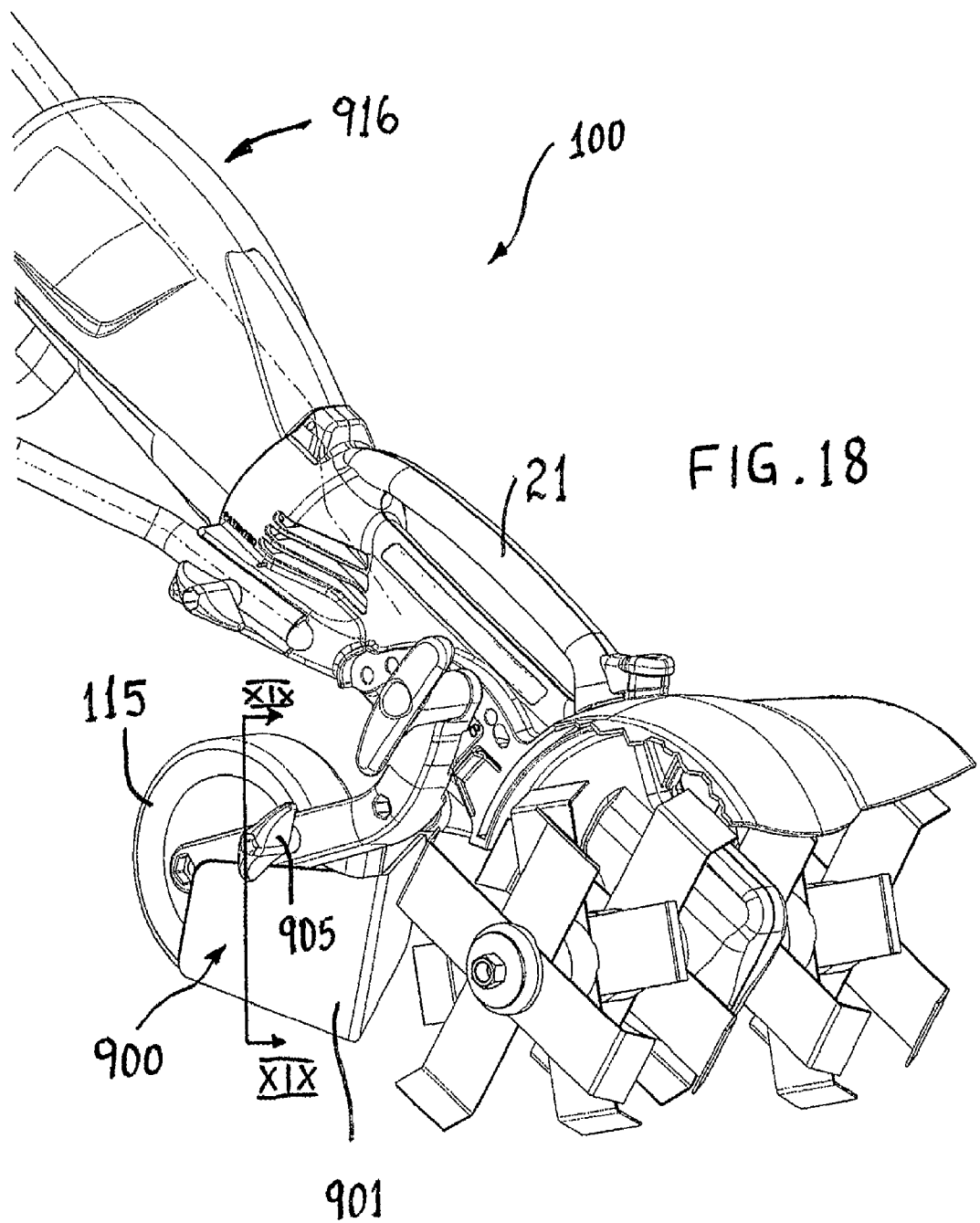
FIG. 18 is a perspective view of the tiller of FIGS. 6-15 modified to have an electric motor and including a furrow forming accessory.
Figure 19:
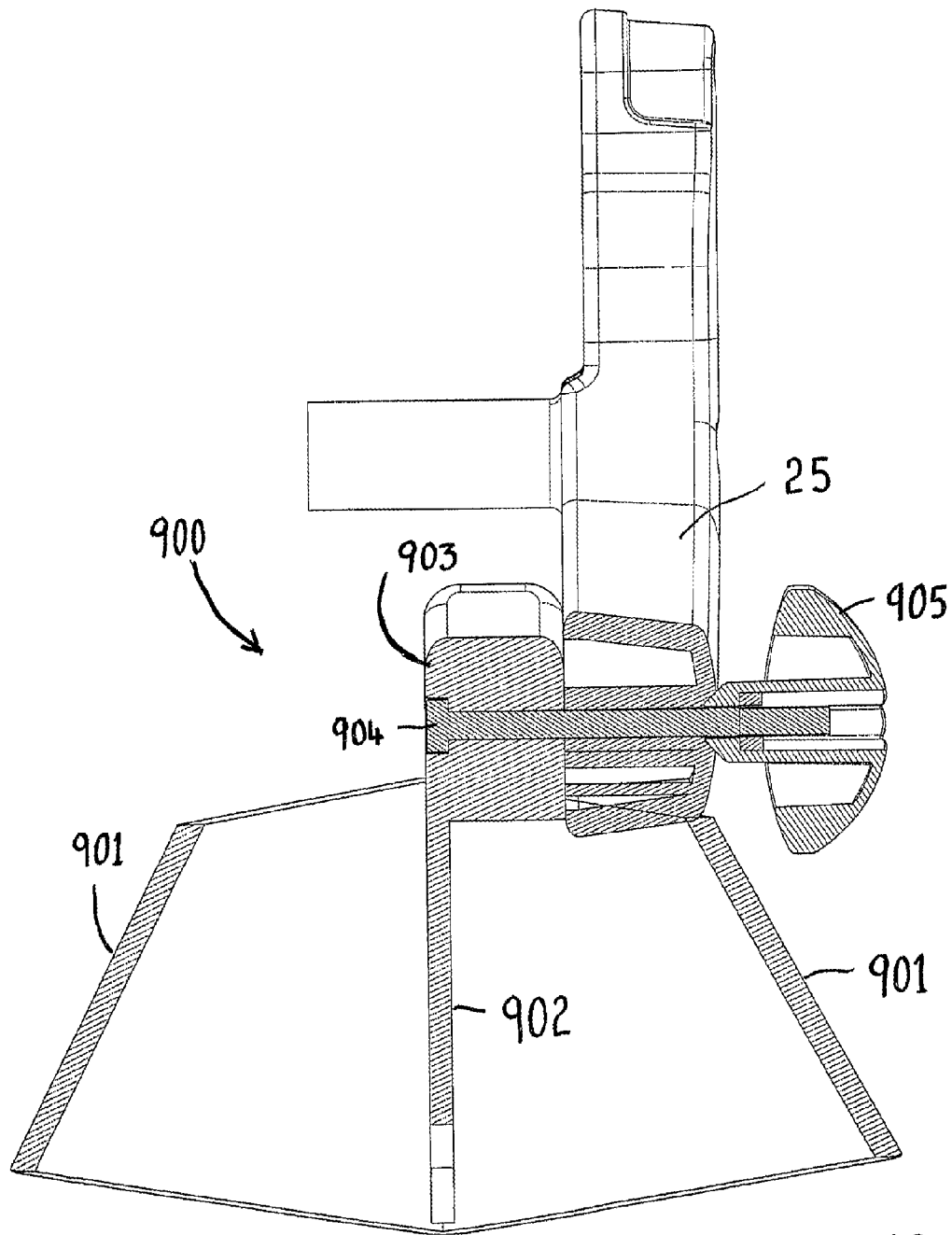
FIG. 19 is a cross-sectional view taken along the line XIX-XIX of FIG. 18.

As seen in FIG. 18, the tiller 100 can be provided with an electric motor 916. The tiller 100 can also be provided with a furrow forming attachment 900 (which is illustrated in cross-section in FIG. 19). The attachment takes the form of a V-shaped tip 901 which functions as a coulter or ploughshare to form a furrow in the tilled soil (not illustrated) and which can be used to receive seeds. The tip 901 is preferably symmetrical with respect to the longitudinal axis if the tiller 100 and is supported on a longitudinally arranged and vertically extending rib 902 (FIG. 19) which projects downwardly from a spine 903. When a furrow is required, the spine 903 is releasably secured to the arm 25 by means of a bolt 904 (which passes through both the spine 903 and arm 25) with which a wing nut 905 is releasably threadably engaged. Thus the attachment 900 can be removed or attached to the tiller 100 as desired.

With the attachment 900 attached, the tip 901 forms a groove in the tilled soil and along which the wheel 115 travels. This groove or furrow can be used to receive seeds which are manually dropped into the furrow. Then the furrow is manually filled in using a rake, spade or like implement (not illustrated).

Alternatively, instead of being mounted to the arm 25, the furrow forming attachment 900 can be mounted directly to the chassis 114 or tine guard 119, or other parts of the tiller 100.

The foregoing describes only one embodiment of the present invention and modifications, obvious to those skilled in the soil tilling arts, can be made thereto without departing from the scope of the present invention. For example, the single wheel 115 can be replaced by a pair of adjacent and substantially abutting wheels in order to increase the effective width of the wheel rim.

The term "comprising" (and its grammatical variations) as used herein is used in the inclusive sense of "including" or "having" and not in the exclusive sense of "consisting only of."

What is claimed is:

1. An implement comprising a ground engaging wheel means supporting a chassis, a pair of operating handles at one end of said chassis, at least one cutting blade at the other end of said chassis, and an engine power unit supported by said chassis and arranged to rotate said at least one cutting blade via a gearbox located intermediate said engine power unit and said at least one cutting blade, the components of said implement other than said operating handles, said cutting blade(s), said wheel means and said engine power unit being contained within an exterior housing having an exterior surface, said chassis being of monocoque construction and being longitudinally split into two complementary portions which together form an interior housing for said gearbox, each of said complementary portions having an interior surface and an exterior surface, the exterior surfaces of said two complementary portions together forming substantially the entirety of the exterior surface of said exterior housing of the implement, and said gearbox having a sealed interior formed entirely from opposed parts of the interior surfaces of said complementary portions.

2. The implement of claim 1, wherein said two complementary portions are substantially equal in size.

3. The implement of claim 2, wherein said two complementary portions are substantially mirror images of each other.

4. The implement of claim 3, further comprising a loop seal that seals said housing for said gearbox.

5. The implement of claim 4, wherein said two complementary portions each include one half of a longitudinally split handle.

6. The implement of claim 5, wherein said chassis is molded from plastics material.

7. The implement of claim 1, further comprising a fixed third handle extending at least part way along said chassis and located close to the centre of gravity of said implement.

8. The implement of claim 7, wherein said fixed third handle is longitudinally extending, inverted, and substantially U-shaped, and is located at a dorsal position on said chassis.

9. The implement of claim 7, wherein said fixed third handle is longitudinally split into two portions and each of said two complementary portions of said chassis includes a portion of said fixed third handle.

* * * * *